April 27, 1943.   W. C. CALVERT   2,317,730
LAMINATED SHEET MATERIAL
Filed Aug. 25, 1939
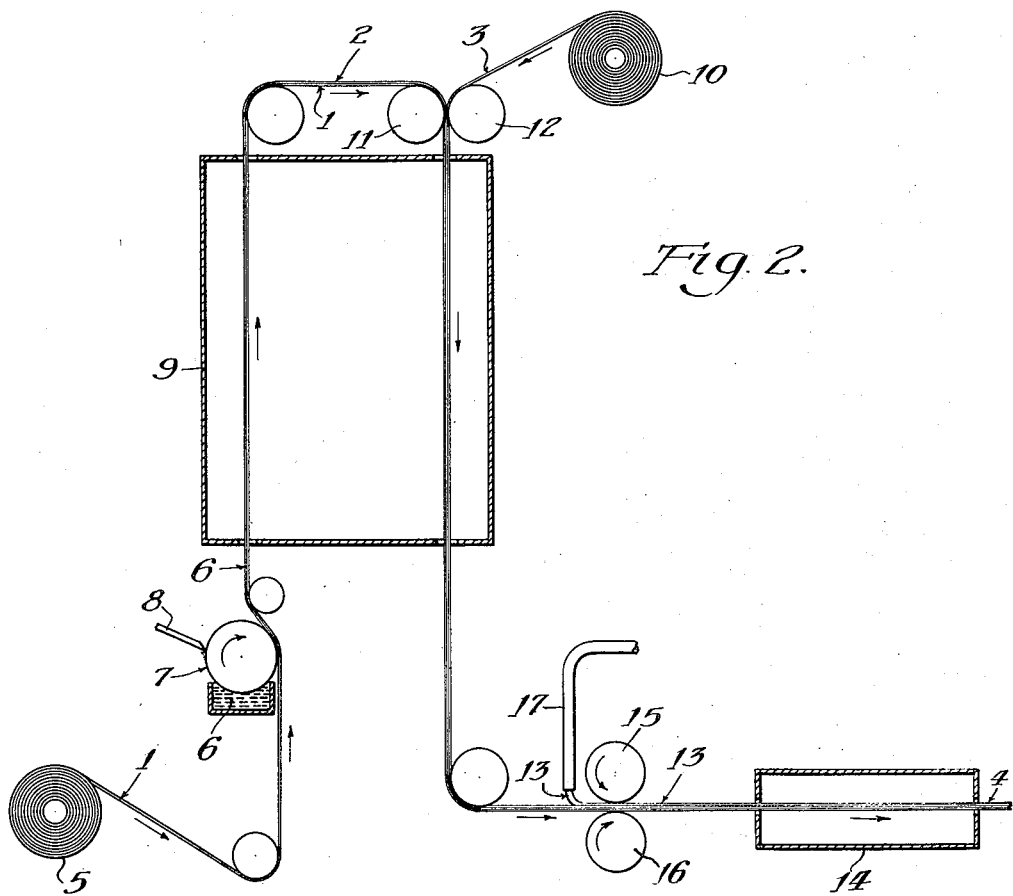
Inventor
William C. Calvert
By
Zabel, Carlson, Fitzhugh & Wells
Attorneys Patented Apr. 27, 1943

2,317,730

UNITED STATES PATENT OFFICE 2,317,730

LAMINATED SHEET MATERIAL

William C. Calvert, Gary, Ind., assignor to Marbon Corporation, Gary, Ind., a corporation of Delaware Application August 25, 1939, Serial No. 291,869

2 Claims. (Cl. 154—50)

The invention relates to laminated sheet material and method of making same.

One embodiment of the invention is a laminated pliable sheet material comprising a sheet of paper secured to another sheet of paper by a tough, waterproof, elastic composition, the laminated material being coated on at least one side with a waterproof heat sealing composition. Such laminated sheet material may be fabricated into heat sealed containers or bags particularly adapted for holding brine.

Other objects and advantages of the invention will become apparent as the following detailed description progresses, reference being had to the accompanying drawing in which—

Fig. 1 is a sectional view greatly enlarged, showing the laminated material of the present invention; and Fig. 2 is a diagrammatic view showing how the material is made.

Referring to the drawing in which the preferred embodiment of the invention is illustrated, the reference character 1 is a sheet of kraft paper or similar heavy bag paper laminated by means of an elastic and an adherent composition 2 to a porous tissue paper 3, the tissue paper being coated with a heat sealing composition 4.

The sheet of paper 1 is preferably a sulfate bag paper weighing 50 pounds per ream of 24" x 36" sheets having a thickness of about .0035". A strong and heavy sulphite paper may also be used.

The paper 3 may suitably be an uncalendered tissue of about 12 pounds per ream of 24" x 36".

The laminating adhesive 2 may suitably be any elastic adherent composition. It may be coated on the paper 1 by depositing thereon a rubber cement and evaporating the solvent therefrom. Preferably the rubber cement should contain a wax in order to increase water resistance. In place of rubber other materials having the elastic character of rubber may be used. Suitable materials include neoprene (rubber-like polymerized chloroprene, Thiokol (the trade name for a rubber-like polymethylene-polysulfide plastic), and Koroseal (the trade name for a rubber-like plasticized polyvinylchloride), as well as other synthetic rubbers and rubber substitutes which are film-forming, flexible, elastic and which will adhere to paper.

The heat sealing coating 4 may suitably be any thermoplastic composition which becomes tacky on the application of heat, and which by itself or after plasticizing is flexible. Suitable compositions may be obtained by depositing solutions of rubber hydrochloride or thermoplastic cyclorubbers on the paper and evaporating the solvent therefrom. Any soluble type of rubber hydrochloride is suitable such as amorphous rubber hydrochloride and partially saturated rubber hydrochloride. Cyclorubbers which may be used include those obtainable by reacting rubber with chlorostannic acid and sold under the trade name of Pliolite, and also the cyclorubber obtained by reacting rubber with a phenol in the presence of hydrochloric acid.

The laminated material may be made preferably by the process that has been diagrammatically illustrated in Fig. 2. The kraft paper 1 is supplied from roll 5 and is coated with the elastic film-forming composition 6 by means of a reverse roll 7 and doctor device 8. The coated paper then proceeds upwardly through a vertical drying tower 9 whereby in the upward travel the solvent is partially removed from the elastic film-forming composition 6, leaving an elastic adherent layer 2 on the paper 1. A sheet of tissue paper 3 is supplied from roll 10 and is laminated to the coated kraft paper at the top of the tower by means of pressure rolls consisting of a rubber covered roll 11 and a steel roll 2. The laminated sheet so formed then proceeds downwardly through the tower whereby the remainder of the solvent is removed. The laminated sheet is then coated on the tissue side with a heat sealing coating composition 13 supplied through inlet 17, and applied to the tissue paper by means of rolls 15 and 16. The coated laminated sheet then proceeds through the horizontal drying tunnel 14 where the solvent is evaporated from the composition 13 to form the heat sealing coating 4. The laminated sheet is then ready for fabricating into bags.

To more clearly set forth the practice in accordance with the invention and to more specifically point out the nature of the product and process contemplated thereby, several specific, illustrative examples are hereinafter set forth, it being understood that these examples illustrate several embodiments which have given satisfactory results and are not intended to restrict the invention thereto.

*Example I*

40# kraft paper is coated with 50 lbs. per ream (dry weight) of the following rubber cement:

| | |
|---|---|
| Milled smoked sheet rubber | 100 |
| Whiting | 100 |
| Mineral oil | 10 |
| Amorphous petroleum wax | 10 |
| Wood rosin | 44 |
| Toluene | 396 |

The coating is applied by means of a reverse roll and doctor blade device and the solvent partially removed in a vertical drying tower using circulating warm air. At the top of the tower, the coated kraft paper is laminated to 12# uncalendered tissue by means of pressure rolls consisting of one rubber covered roll and one steel roll. The balance of the solvent is removed in the downward travel of the sheet.

The laminated sheet is then treated on the tissue side with two coats of 8# each of the following:

| | |
|---|---|
| Amorphous rubber hydrochloride | 100 |
| Polyamylnaphthalene | 10 |
| Paraffin wax | 1 |
| Toluene | 555 |

Each coat is dried in a horizontal drying tunnel with circulating air at 160–170° F. and 50% relative humidity. The paper is then ready for fabricating into bags.

Example II

The above is repeated except that 60# per ream of the following composition is substituted for the laminating adhesive:

| | |
|---|---|
| Reclaimed rubber (inner tube) | 3# |
| Antioxidant | .03# |
| Wood rosin | 1.5# |
| Amorphous rubber hydrochloride | 1.0# |
| Toluene | 10.0# |

Example III

Example #I is repeated except that 40# per ream of the following composition is substituted for the laminating adhesive:

| | |
|---|---|
| Milled smoked sheet rubber | 100 |
| Zinc oxide | 5 |
| Zinc butyl xanthate | 1 |
| Dibenzylamine | .5 |
| Sulphur | 2 |
| Petroleum solvent (1900–208° F.) boiling range | 600 |

Example IV

Example #I is repeated using a 30# sulphite paper in place of the kraft paper.

Example V

Example #I is repeated using, instead of a rubber hydrochloride solution as a coating for the tissue, the following composition:

| | |
|---|---|
| Cyclorubber (14% unsaturation) | 100 |
| Hydrogenated rosin ester | 10 |
| Paraffin | 10 |
| Petroleum solvent (177–230° F.) | 300 |

Example VI

Example #I is repeated except that the tissue is coated on both sides (6# per ream) before laminating with the rubber hydrochloride composition. After lamination, the tissue surface is given a second coat of 11# per ream of rubber hydrochloride solution.

Example VII

Example #I is repeated except that the tissue is given two coats of 9# each on one side only and then the uncoated side laminated to the kraft paper as before.

The laminated sheets having a surface covered with rubber hydrochloride or cyclorubber may be folded, and heat sealed to form bags for holding brine. Such bags are strong, water-proof, and have given superior results for holding brine. The laminated sheets having a surface covered with rubber hydrochloride have also given satisfactory results when made into bags for holding oil.

While there have been shown and described certain embodiments of the invention, it is to be understood that it is capable of many modifications. Changes therefore, may be made without departing from the spirit and scope of the invention as described in the appended claims, in which it is the intention to claim all novelty inherent in the invention as broadly as possible in view of the prior art.

I claim:

1. A laminated pliable sheet material adapted to be folded and made into bags for holding brine, comprising a sheet of paper coated with an elastic composition comprising a major proportion of rubber and a minor proportion of a wax, a porous sheet of paper laminated to said elastic composition, and a heat sealing composition bonded through said porous paper to said rubber and wax composition.

2. A laminated pliable sheet material adapted to be folded and made into bags for holding brine, comprising a sheet of paper coated with an elastic composition comprising a major proportion of rubber and a minor proportion of a wax, a porous sheet of paper laminated to said elastic composition, and a heat sealing composition of a cyclorubber bonded through said porous paper to said rubber and wax composition.

WILLIAM C. CALVERT.